United States Patent
Cheetancheri et al.

(10) Patent No.: US 10,229,104 B2
(45) Date of Patent: Mar. 12, 2019

(54) EFFICIENT DFA GENERATION FOR NON-MATCHING CHARACTERS AND CHARACTER CLASSES IN REGULAR EXPRESSIONS

(71) Applicant: SONICWALL US HOLDINGS INC., Santa Clara, CA (US)

(72) Inventors: Senthilkumar Gopinathan Cheetancheri, Sunnyvale, CA (US); Aleksandr Dubrovsky, San Mateo, CA (US)

(73) Assignee: SONICWALL INC., Milpitas, CA (US)

( * ) Notice: Subject to any disclaimer, the term of this patent is extended or adjusted under 35 U.S.C. 154(b) by 373 days.

(21) Appl. No.: 13/957,319

(22) Filed: Aug. 1, 2013

(65) Prior Publication Data
US 2015/0040142 A1 Feb. 5, 2015

(51) Int. Cl.
*G06N 5/02* (2006.01)
*G06N 5/00* (2006.01)
*G06F 17/27* (2006.01)

(52) U.S. Cl.
CPC .......... *G06F 17/27* (2013.01); *G06N 5/003* (2013.01); *G06N 5/02* (2013.01); *G06N 5/022* (2013.01); *G06N 5/025* (2013.01)

(58) Field of Classification Search
CPC .......... G06N 5/003; G06N 5/02; G06N 5/022; G06N 5/025
See application file for complete search history.

(56) References Cited

U.S. PATENT DOCUMENTS

| | | | |
|---|---|---|---|
| 9,489,215 B2 | 11/2016 | Cheetancheri | |
| 2003/0229852 A1* | 12/2003 | Uramoto | G06F 17/272 715/237 |
| 2004/0103378 A1 | 5/2004 | Jain | |
| 2006/0047680 A1 | 3/2006 | Paruthi et al. | |
| 2006/0085389 A1 | 4/2006 | Flanagan et al. | |
| 2008/0047012 A1* | 2/2008 | Rubin | G06F 21/552 726/23 |

(Continued)

OTHER PUBLICATIONS

Antimirov, Valentin "Partial derivatives of regular expressions and finite automaton constructions" Theoretical COmputer Science 155 1996 [Online] Downloaded Jul. 6, 2015 http://ac.els-cdn.com/0304397595001824/1-s2.0-0304397595001824-main.pdf?_tid=e3b29ba2-23ee-11e5-8125-00000aab0f02&acdnat=1436194649_6192963db7b6f5fa2ea2b601ee58747e.*

(Continued)

*Primary Examiner* — Ben M Rifkin
(74) *Attorney, Agent, or Firm* — Polsinelli LLP (57) ABSTRACT

A character class is detected in a regular expression and substituted with a pseudo character. A table is created with a bit vector for each pseudo character inserted into the regular expression. Each bit in the bit-vector represents one character of the alphabet from which the expression is generated. The status of the bits in a bit-vector indicates which characters of the alphabet are included in the character class. The pseudo character in the modified regular expression is used to construct a non-deterministic finite automaton (NFA). The NFA with the pseudo character is then used to construct a deterministic finite automaton (DFA). When constructing the DFA, the bit-vectors are used to determine if a certain transition should be constructed in the DFA.

20 Claims, 7 Drawing Sheets (56) References Cited

U.S. PATENT DOCUMENTS

2008/0270836 A1 10/2008 Kallakuri et al.
2011/0153641 A1 6/2011 Thorup et al.
2011/0161898 A1 6/2011 Chauhdry et al.
2011/0246962 A1 10/2011 Meijer et al.
2011/0258210 A1 10/2011 Agarwal et al.
2012/0192163 A1 7/2012 Glendenning et al.
2012/0192165 A1 7/2012 Xu et al.
2015/0039550 A1 5/2015 Cheetancheri

OTHER PUBLICATIONS

Goyvaerts, Jan "Syntax Reference for Specific Regex Flavors" 2004 Verified by wayback machine [Online] Downloaded Jul. 6, 2015 https://web.archive.org/web/20040610081508/http://www.regular-expressions.info/refext.html.*

Lunteren, Jan van and Alexis Guanella "Hardware-Accelerated Regular Expression Matching at Multiple Tens of GB/S" IEEE 2012 [Online] Downloaded Jul. 6, 2015 http://ieeexplore.ieee.org/stamp/stamp.jsp?tp=&arnumber=6195546.*

IEEE 100 The Authoritative Dictionary of IEEE Standards Terms, 7th Edition, 2000, 5 pages.

U.S. Appl. No. 13/957,322 Final Office Action dated Dec. 31, 2015.

U.S. Appl. No. 13/957,322 Office Action dated Jun. 3, 2015.

* cited by examiner

| | | | abcde ... | z |
|---|---|---|---|---|
| α | [a-d] | | 1 1 1 1 0 ... | 0 |
| β | [^b] | | 1 0 1 1 1 ... | 1 |
| γ | [^a-d] | | 0 0 0 0 1 ... | 1 |

EFFICIENT DFA GENERATION FOR NON-MATCHING CHARACTERS AND CHARACTER CLASSES IN REGULAR EXPRESSIONS

BACKGROUND OF THE INVENTION

A deterministic finite automaton (DFA) or deterministic finite state machine is a set of states tied together by a set of transitions. The transitions may specify movement from one state to another based on some input. A DFA at a given state and for a given input has only one transition to a next state. Examples of such deterministic finite automaton may be designed in hardware or software to produce results based on the state and any input. Some applications for a DFA involve electronic systems, such as network equipment and computer operated systems.

A DFA may be constructed from a non-deterministic finite automaton (NFA), which may be constructed from a regular expression. Construction of a DFA can be expensive in terms of time and computing resources. For longer expressions, construction of a DFA can take extended periods of time and require all resources of a machine, thereby affecting performance of the machine.

There is a need in the art for improved methods of constructing DFAs which won't tie up an undesirable amount of computer time and computing resources.

SUMMARY OF THE CLAIMED INVENTION

The present system detects character class in a regular expression and substitutes a pseudo character for the character class. A table of bit-vectors is created with one bit-vector for each pseudo character inserted into the regular expression. The bit-vector includes each and every letter of the alphabet. The status of the bits in the bit-vector indicates which elements of the alphabet are included in the corresponding character class. The pseudo character in the modified regular expression is used to construct a non-deterministic finite automaton (NFA). The NFA with the pseudo character is then used to construct a deterministic finite automaton (DFA). When constructing the DFA, the bit vectors are used to construct transitions in the DFA.

In an embodiment, a method for generating a DFA may begin with accessing an expression. A character class may then be detected in the expression. A pseudo character may be substituted for the character class in the expression. A DFA is then constructed by an application stored in memory and executed on a processor. The DFA is constructed by the application from the expression with the pseudo character.

A system for monitoring a business transaction may include a processor and a memory. An application may be stored in the memory and executed by the processor to access an expression, detect a character class in the expression, substitute a pseudo character for the character class in the expression, and build a DFA from the expression with the pseudo character.

DETAILED DESCRIPTION

Embodiments of the invention described herein detect a character class in a regular expression and substitutes a pseudo character for the character class. A bit vector is created for each pseudo character inserted into the regular expression. The bit vectors indicate which elements of the alphabet are included in the character class. All bit vectors are stored in a table that can be looked-up by the pseudo character. The pseudo character in the modified regular expression is used to construct a non-deterministic finite automaton (NFA). The NFA with the pseudo character is then used to construct a deterministic finite automaton (DFA). When constructing the DFA, the bit vectors are used to construct transitions in the DFA.

Figure 1:
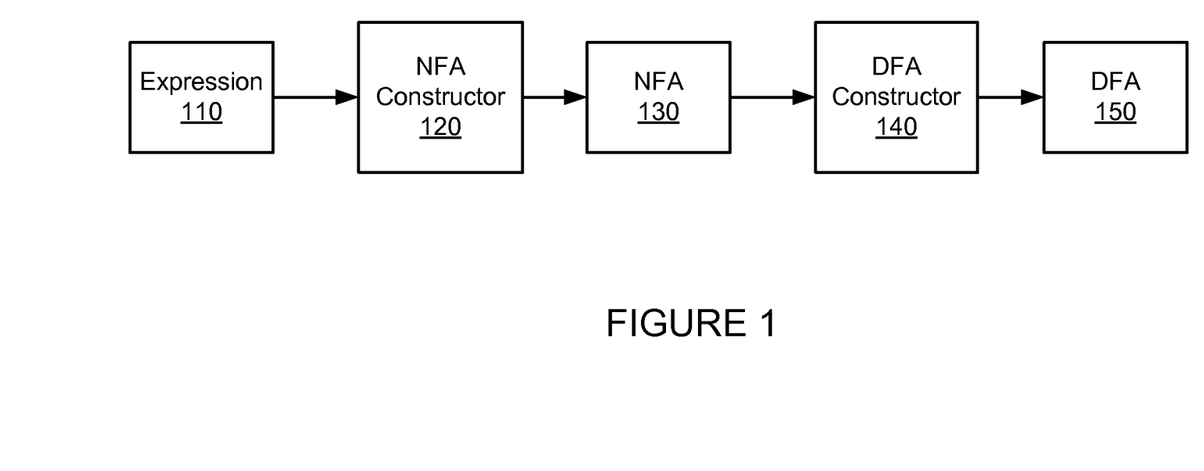
FIG. 1 is a block diagram illustrating the construction of a DFA from an expression.

FIG. 1 is a block diagram illustrating the construction of a DFA from an expression. An expression 110 such as a primitive regular expression may be accessed by a NFA constructor 120 to create an NFA. The NFA constructor and DFA constructor may be implemented by one or more software modules and/or hardware circuits. For the given expression, the representative NFA may contain 2 |r| nodes, where r is the number of operands and operators in the expression. An operand specifies what data is to be manipulated within the expression and an operator specifies a function to perform using the operand. The time taken to construct an NFA is proportional to r.

Figure 2A:
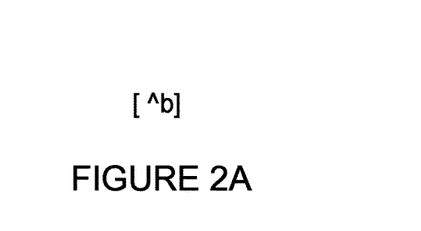
FIG. 2A illustrates an expression.
Figure 2B:
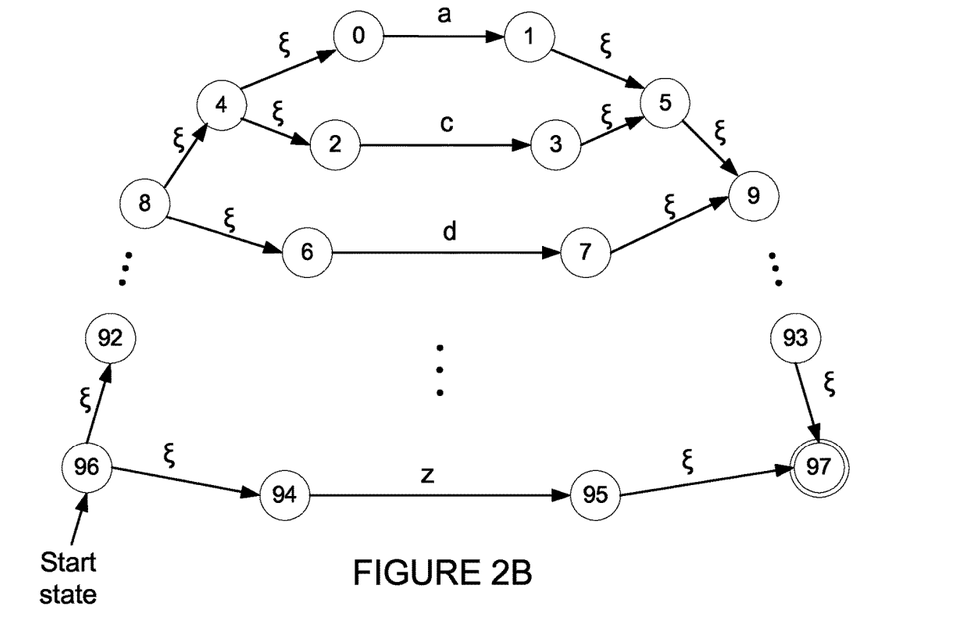
FIG. 2B illustrates an NFA for the expression of FIG. 2A constructed using the known methods (or traditional methods)

FIG. 2A illustrates an expression. The expression of FIG. 2A reads "[^b]". If the "alphabet", i.e. the set of characters from which the expression may be built, for the regular expression is all the 26 lower case letters of the English language, the equivalent primitive expression is "a|c|d|e|f|g|h|i|j|k|l|m|n|o|p|q|r|s|t|u|v|w|x|y|z". The expression of FIG. 2A has 25 operands, including all letters a through z except the letter b, and 24 operators, one "|" between each of the 25 operands. The 25 operands and 24 operators can be combined, resulting in a value of 49 for r. FIG. 2B illustrates an NFA for the expression of FIG. 2A. As shown, the NFA for the expression of FIG. 2A has 98 nodes, or 2 |r| nodes.

DFA engine 140 may construct DFA 150 from NFA 130. The time to construct the DFA may depend on the number of states s in the DFA being constructed, and is proportional to r^2.s. The size s of a DFA is typically |r|. In some cases, however, a DFA may become exceptionally large for certain degenerate regular expressions. For example, the degenerative regular expression (a|b)*a(a|b){n−1} may generate a DFA having at least 2^n states. Thus, the size of the DFA for such an expression would be 2^r. Thus, the time to generate a DFA may vary. In common cases where the number of states s is about the same as r, the DFA construction may take about r^3. In cases of degenerative expressions, the time may take r^2.2^r.

Figure 2C:
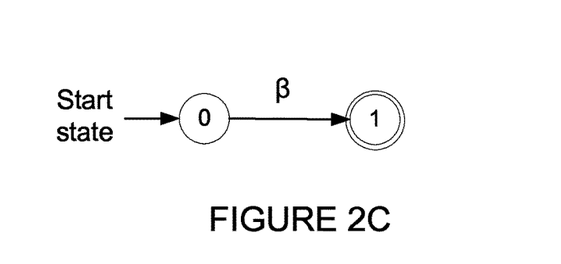
FIG. 2C illustrates an NFA for the expression of FIG. 2A with a pseudo character.

The time to generate an NFA and corresponding DFA can be significantly reduced by substituting a pseudo character for a character class in the regular expression. The character class represented by "[^b]" may be substituted with a single pseudo character "β". As a result, the expression "a|c|d|e|f-|g|h|i|j|k|l|m|n|o|p|q|r|s|t|u|v|w|x|y|z" becomes "β" and the NFA becomes much smaller. The pseudo character will count as just one operand in the regular expression. FIG. 2C illustrates an NFA for the expression of FIG. 2A with a pseudo character. As shown, the NFA in FIG. 2C only has two nodes. Constructing a DFA from this NFA is much quicker than the 98 node NFA of FIG. 2B corresponding to the original regular expression.

Figure 3:
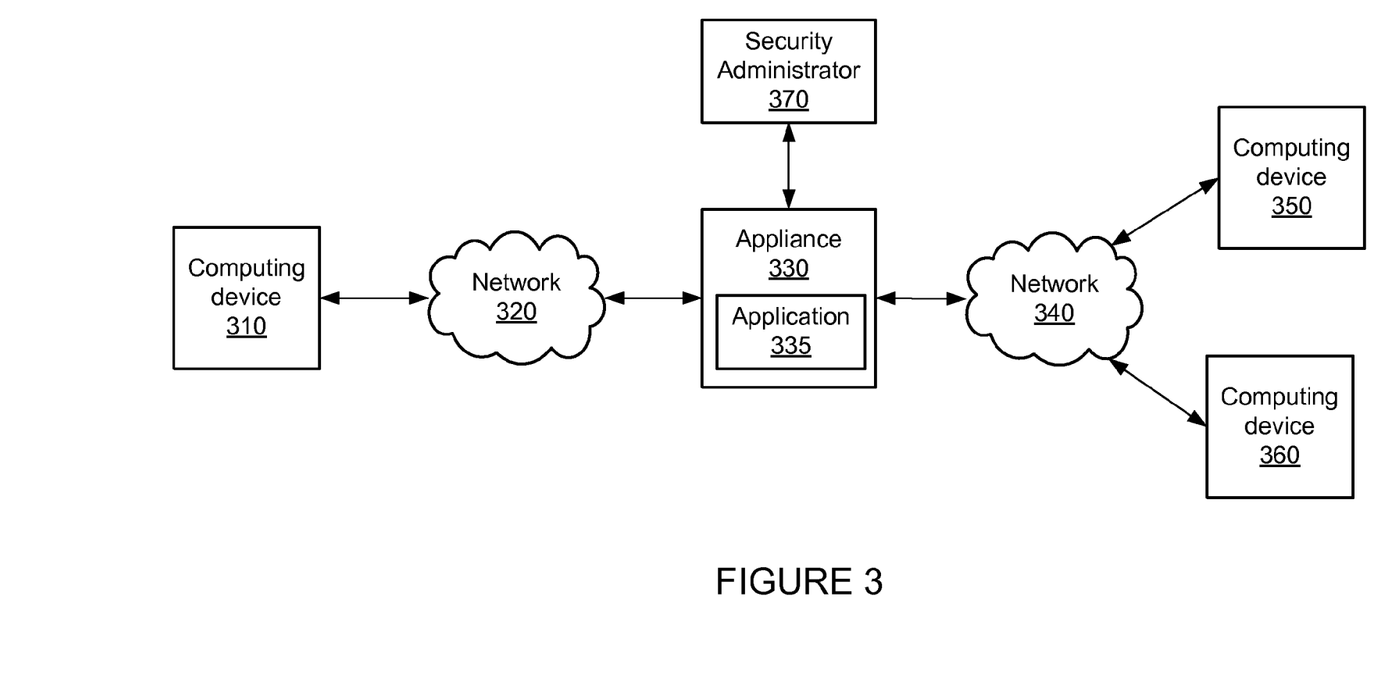
FIG. 3 is a system for utilizing a DFA in pattern analysis.

FIG. 3 is a system for utilizing a DFA in pattern analysis. The system of FIG. 3 includes computing devices 310, 350 and 360, networks 320 and 340, and appliance 330. Computing device 310 may communicate with appliance 330 over network 320. Network 320 may be implemented as one or more private networks, public networks, the Internet, an intranet, a WAN, a LAN, a WiFi network, a cellular network, or a combination of one or more of these networks.

Appliance 330 may communicate with computing devices 310, 350 and 360 over networks 320 and 340, respectively. Appliance 330 may include application 335 which may implement one or more NFA engines and DFA engines. An expression may be received by appliance 330 from the appliance administrator. Application 335 may receive the expression, substitute pseudo characters for a character class in the regular expression, generate a table of bit vectors corresponding to the pseudo character, construct an NFA from the expression with the pseudo code, and construct a DFA from the NFA. The final DFA is used to look for patterns in the traffic passing through the Appliance 330 matching the original regular expression given by the appliance administrator. The NFA and DFA construction processes are discussed in more detail below.

In embodiments, the system of FIG. 3 may include a security module 370. Security module 370 may have access to one or more registered regular expressions that may be compared to the data received in traffic. The stored expressions may represent undesirable script, malware or other code. When a match occurs, the security administration module 370 may provide an alert to a user via email, SMS, or other communication method.

Figure 4A:
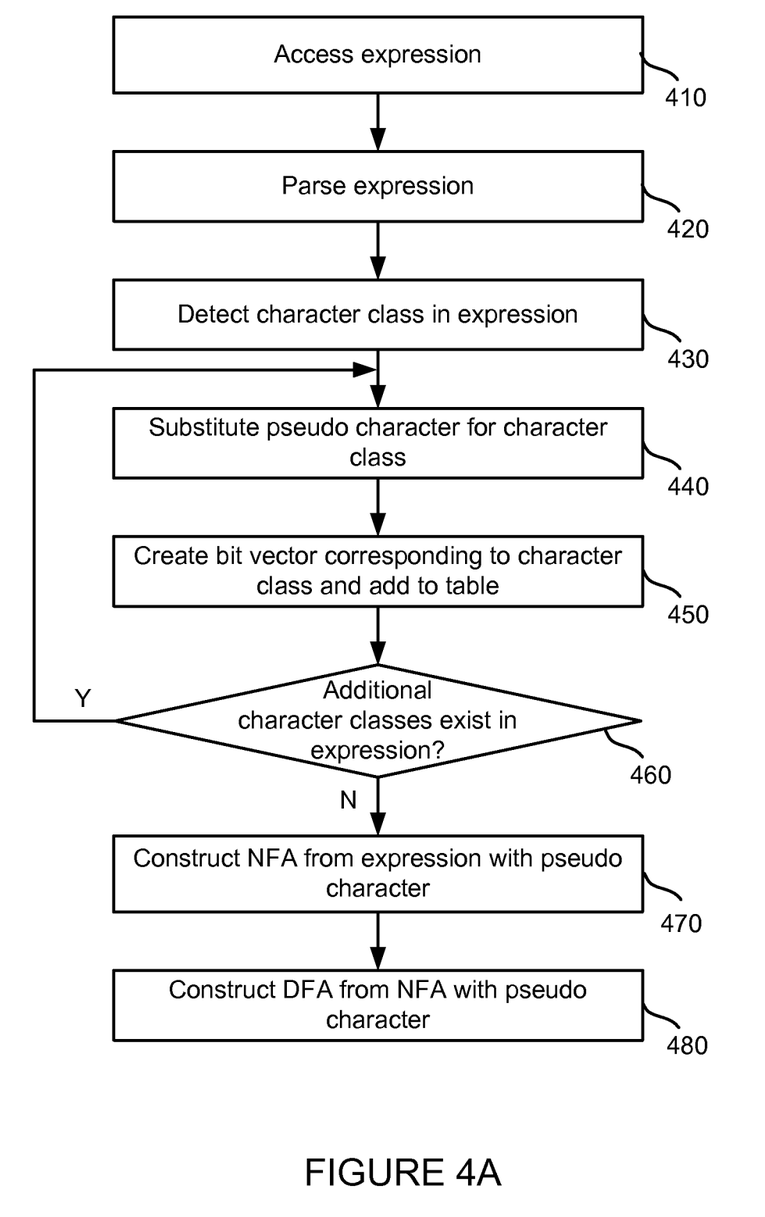
FIG. 4A illustrates a method for substituting a pseudo character for a character class.

FIG. 4A illustrates a method for substituting a pseudo character for a character class. The method of FIG. 4A may be implemented by appliance 330 of FIG. 3.

First, an expression may be accessed at step 410. The expression may be a regular expression. The expression may be a common expression or a degenerative expression, corresponding to a DFA construction time of $r^3$ or $r^2.2^r$, respectively. The expression is provided by the appliance administrator who wants to identify traffic matching the pattern expressed by the expression.

The expression is parsed at step 420. In embodiments, the expression may be parsed as it is received. The opening bracket "[" identifies the beginning of a character class. The closing bracket "]" identifies the end of a character class. A range of characters can be expressed using a hyphen, "–". For example the expression "[a-z]" is a class of all the lower case English characters. A "^" in the beginning of the range represents all characters other than the character or range provided. For example, the expression "[^b]" represents all characters of the alphabet other than the letter "b". The expression [^a-d] represents all characters other than the letters a, b, c, and d.

A character class is detected in the expression at step 430. Once detected, a pseudo character is substituted for the character class at step 440. The pseudo character may actually be inserted into a stored version of the regular expression in place of the character class detected within the original expression.

A bit-vector associated with the character class is created and stored in a table at step 450. A bit-vector is a sequence of bits corresponding to each character of the alphabet. The status of each bit ("1" or "0") in the bit-vector indicates whether the corresponding character is included in the character class or not. The table will contain one bit-vector for each character class identified in the regular expression provided by the appliance administrator. For example, the expression [^b] is a character class which includes every character of the alphabet except b. The corresponding bit-vector would include a "1" value for every character of the alphabet except for the character "b". The bit for character "b" within the bit-vector would have a value "0".

Figure 4B:
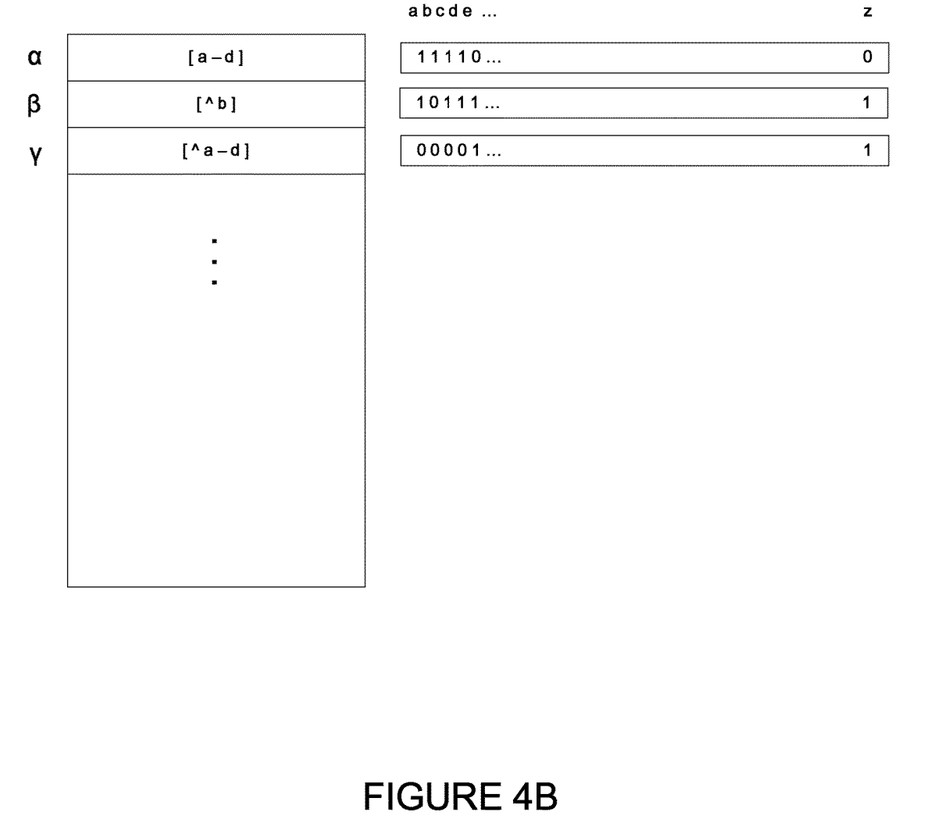
FIG. 4B illustrates a table of bit vectors.

FIG. 4B illustrates a table of bit vectors. The table of FIG. 4B includes a series of expressions, and a corresponding bit vector for each. Each expression is referenced by the pseudo character. For example, the expressions [a-d], [^b], and [^a-d] correspond to pseudo characters α, β, and γ. The table may be stored in memory locally or remotely, such that it could be accessed during construction of a corresponding NFA and DFA.

After creating the bit-vector and storing it in the table, a determination is made as to whether additional character classes exist in the expression at step 460. If additional character classes exist, the method returns to step 440 where a pseudo character is substituted for the character class. The pseudo code substituted for subsequent classes may be the same (if the subsequent class is the same class) or different (if the subsequent class is not the same class) as the first substituted pseudo code.

If additional character classes do not exist at step 460, an NFA is constructed from the expression having the pseudo character at step 470. The NFA may be much simplified when constructed using the pseudo character substituted in the regular expression. A corresponding DFA is constructed from the NFA at step 480. The table of bit-vectors built in step 450 may be consulted during the DFA construction while processing portions of NFA that include the pseudo character. Constructing a DFA from an NFA with a pseudo character is discussed in more detail with respect to FIG. 5.

Figure 5:
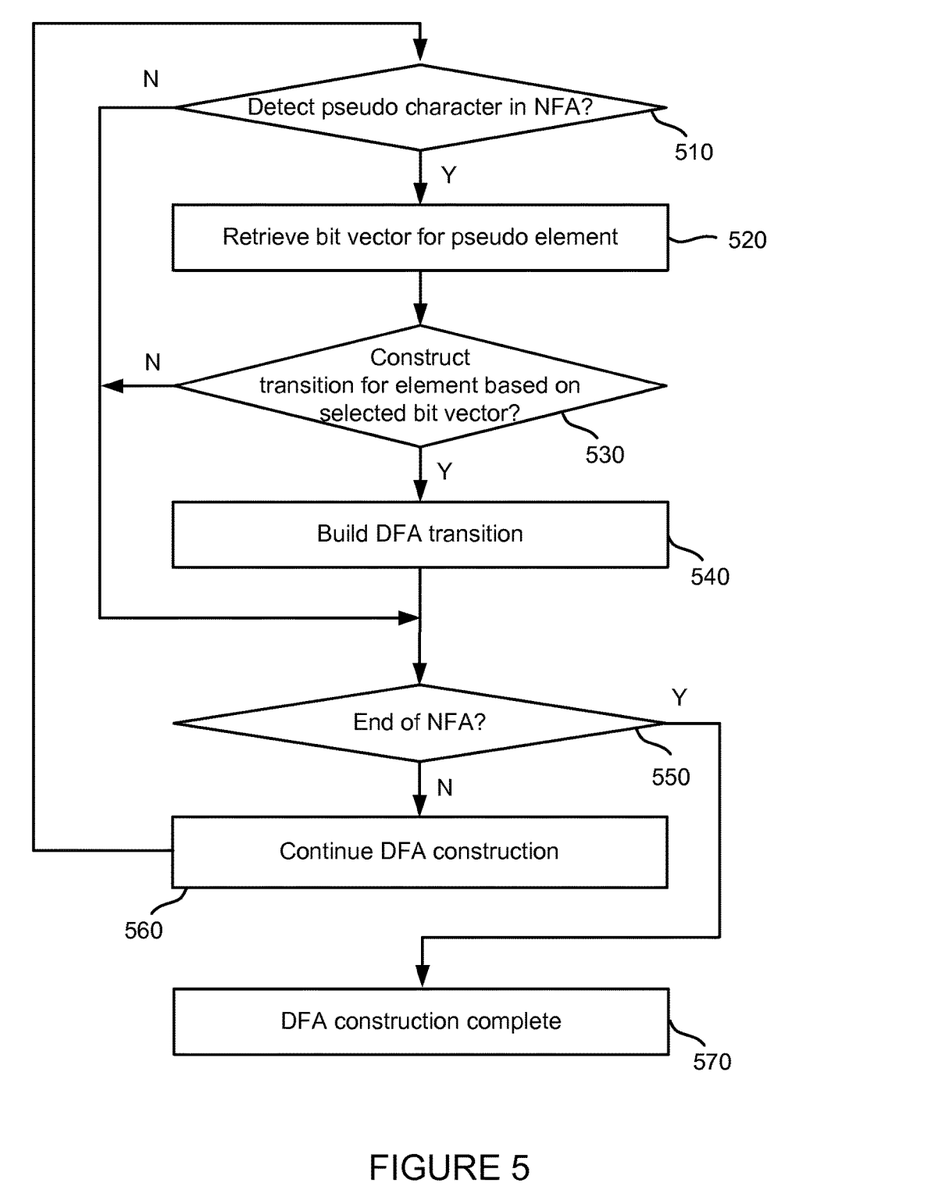
FIG. 5 illustrates a method of constructing a DFA from an NFA with a pseudo character.

FIG. 5 illustrates a method of constructing a DFA from an NFA with a pseudo character. The method of FIG. 5 may provide more detail for step 480 of the method of FIG. 4A. A determination is made as to whether a pseudo character is detected in an NFA at step 510. If a pseudo character is not detected in the NFA, a determination is made at step 550 as to whether the end of the NFA is reached. If the end of the NFA is not reached, the non-pseudo character NFA portion is constructed at step 560 and the method of FIG. 5 returns to step 510.

If a pseudo character is detected in an NFA at step 510, the bit-vector for the pseudo character is retrieved at step 520. The table is indexed by the pseudo character, and the bit-vector retrieval may be a simple look-up. Each bit of the bit-vector indicates whether a transition is available for the corresponding character of the alphabet.

A determination is made as to whether to construct a transition for the element based on the selected bit vector at step 530. The determination involves detecting whether the bit value indicates a transition should be provided for an alphabet element corresponding to the particular array element. Put another way, the determination involves identifying whether the character class includes the alphabet member represented by the array element. During subset construction, the bit-vector for the pseudo character is retrieved or looked-up to determine if there is a transition available for a given input character from the alphabet. If the bit vector in the array element for the alphabet element is a "1", the transition is constructed at step 540. If the bit vector in the array element for the alphabet element is a "0", the transition is not constructed and the method of FIG. 5 continues to step 550.

In embodiments, each node of the NFA may be a data structure with the following elements in it:

```
Node NFA
{
    Node id;
    Input character;
    Pointer to Destination Node-1
    Pointer to Destination Node-2
}
```

In a C-implementation, this would result in about 16 bytes per node. Each node of the resulting DFA is a data structure with the following elements in it:

```
Node DFA
{
    Node id;
    Set of NFA nodes representing this DFA node;
    An array of size of the alphabet set, each with pointers to destination DFA node;
}
```

In a C-implementation, this may result in about four bytes for the node-id, four bytes for a pointer to each of the NFA node that forms the DFA node, and memory for the transition table for each node. In a system with an alphabet having 256 characters (such as the ASCII character set), this will be 256 character multiplied by four bytes for each pointer, making it a 1 KB transition table for each DFA node.

At step 550, a determination is made as to whether the end of the NFA has been reached. If the end of the NFA has been reached, the DFA construction is complete at step 570. If the end of the NFA has not been reached, the DFA construction continues at step 560 and the method returns to step 510.

Figure 6:
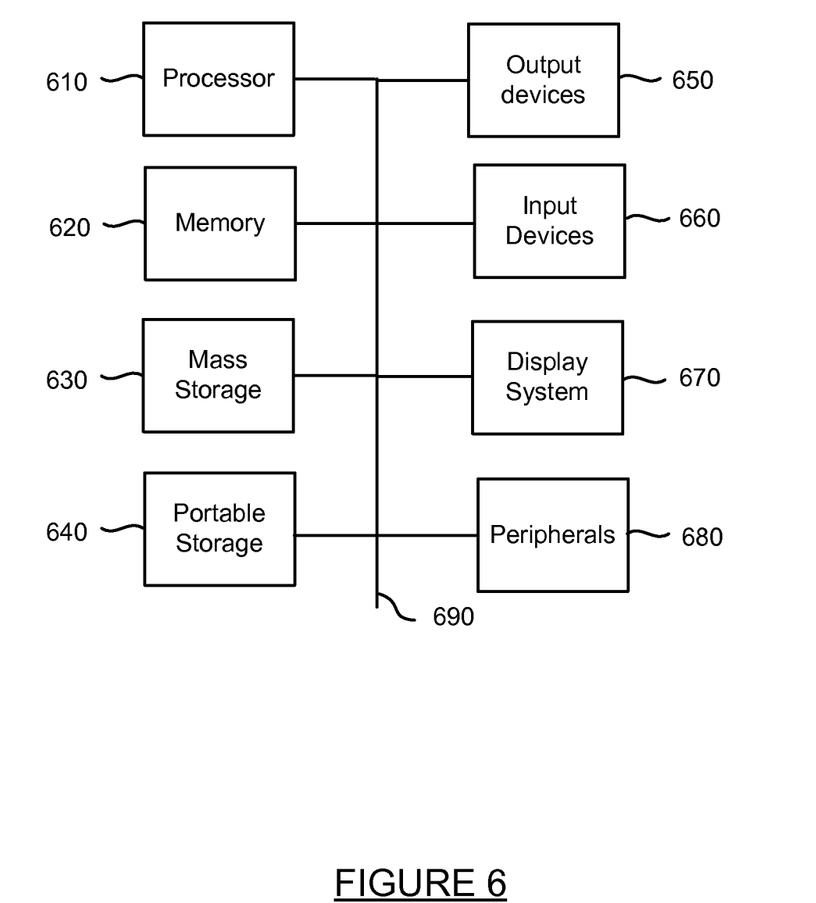
FIG. 6 is a block diagram of an exemplary system for implementing a computing device.

FIG. 6 is a block diagram of an exemplary system for implementing a computing device that may be used to implement a computing device for use with the present technology. System 600 of FIG. 6 may be implemented in the contexts of the likes of computing devices 310, 350 and 360 and appliance 330. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for generating a deterministic finite automaton (DFA) via a processor, the method comprising:
   receiving an expression associated with malware, wherein the received expression is to be constructed into a DFA;
   executing instructions stored in memory, the instructions executed by a processor to:
   detect a character class in the received expression;
   substitute a pseudo character for the detected character class in the received expression;
   generate for the substituted pseudo character, a corresponding bit-vector, wherein the generated bit-vector includes a bit for each of a plurality of alphabet characters, wherein a status of a respective bit within the generated bit-vector reflects whether a respective alphabet character is included in the detected character class of the received expression;

update a table in memory regarding the received expression, wherein the updated table stores the received expression in association with the substituted pseudo character and the generated bit-vector for the detected character class of the received expression;

construct a non-deterministic finite automaton (NFA) from the received expression based on the updated table, wherein constructing the NFA includes inserting the substituted pseudo character in place of the detected character class within the received expression;

construct a DFA from the constructed NFA, wherein constructing the DFA from the constructed NFA includes:
retrieving the generated bit-vector associated with the substituted pseudo character included in the NFA, the generated bit-vector retrieved from the updated table; and
constructing transitions for each node of the NFA based on the retrieved bit-vector;

compares the DFA constructed from the NFA with the stored information in the updated table for the received expression to identify whether the DFA matches the stored information for the received expression; and identifies that the received expression includes malware when the DFA matches the stored information for the received expression; and sending a communication to a user device, the communication including an alert that the received expression includes the malware.

2. The method of claim 1, further comprising:
parsing the received expression; and
detecting a second character class in the parsed expression.

3. The method of claim 1, further comprising creating the table and storing the table in memory.

4. The method of claim 3, further comprising:
detecting that the received expression includes a different character class associated with a different pseudo character; and
generating a different bit-vector for the different character class detected in the expression.

5. The method of claim 4, further comprising updating the table regarding the different bit-vector for the different character class detected in the received expression.

6. The method of claim 1, wherein the expression is received from an appliance administrator.

7. The method of claim 1, wherein the expression includes a beginning character and a closing character common to a plurality of expressions.

8. A non-transitory computer-readable storage medium having embodied thereon a program, the program being executable by a processor to perform a method for generating a definite finite automaton (DFA), the method comprising:
receiving an expression associated with malware, wherein the received expression is to be constructed into a DFA;
detecting a character class in the received expression;
substituting a pseudo character for the detected character class in the received expression;
generating for the substituted pseudo character, a corresponding bit-vector, wherein the generated bit-vector include a bit for each of a plurality of alphabet characters and a status of a respective bit within the generated bit-vector reflects whether a respective alphabet character is included in the detected character class of the received expression;
updating a table in memory regarding the received expression, wherein the updated table stores the received expression in association with the substituted pseudo character and the generated bit-vector for the detected character class of the received expression;
constructing a non-deterministic finite automaton (NFA) from the received expression having at least one substituted pseudo character;
constructing a DFA from the constructed NFA, wherein constructing the DFA from the constructed NFA includes:
retrieving the generated bit-vector associated with the substituted pseudo character included in the NFA, the generated bit-vector retrieved from the updated table, and
constructing transitions for each node of the NFA based on the retrieved bit-vector;
comparing the DFA constructed from the NFA with the stored information in the updated table for the received expression to identify whether the DFA matches the stored information for the received expression; and
identifying that the received expression includes malware when the DFA matches the stored information for the received expression; and
sending a communication to a user device, the communication including an alert that the received expression includes the malware.

9. The non-transitory computer readable storage medium of claim 8, wherein the program further comprises instructions executable to:
parse the received expression; and
detect a character class in the parsed expression.

10. The non-transitory computer readable storage medium of claim 8, wherein the program further comprises instructions executable to create the table and store the table in memory.

11. The non-transitory computer readable storage medium of claim 10, the program further executable to:
detect that the received expression includes a different character class associated with a different pseudo character; and
generate a different bit-vector for the different character class detected in the expression.

12. The non-transitory computer readable storage medium of claim 11, the program further executable to update the table regarding the different bit-vector for the different character class detected in the received expression.

13. The non-transitory computer-readable storage medium of claim 8, wherein the expression is received from an appliance administrator.

14. The non-transitory computer-readable storage medium of claim 8, wherein the expression includes a beginning character and a closing character common to a plurality of expressions.

15. A system for generating a definite finite automaton (DFA), the system comprising:
a memory;
a processor that executes an application is stored in the memory, wherein the processor executes the application to:

receive an expression associated with malware, wherein the received expression is to be constructed into a DFA, detect a character class in the received expression, substitute a pseudo character for the detected character class in the received expression;

generate for the substituted pseudo character, a corresponding bit-vector; wherein the generated bit-vector includes a bit for each of a plurality of alphabet characters, wherein a status of a respective bit identifying within the generated bit-vector reflects whether a respective alphabet character is included in the detected character class of the received expression;

update a table in memory regarding the received expression, wherein the updated table stores the received expression in association with the substituted pseudo character and the generated bit-vector for the detected character class of the received expression;

construct a non-deterministic finite automaton (NFA) from the received expression substituted based on the updated table, wherein constructing the NFA includes inserting the pseudo character in place of the detected character class within the received expression;

construct a DFA from the NFA, wherein constructing the DFA includes:

retrieving the generated bit-vector associated with the substituted pseudo character included in the NFA, the generated bit-vector retrieved from the updated table; and constructing transitions for each node of the NFA based on the retrieved bit-vector;

compares the DFA constructed from the NFA with the stored information in the updated table for the received expression to identify whether the DFA matches the stored information for the received expression; and identifies that the received expression includes malware when the DFA matches the stored information for the received expression; and sending a communication to a user device, the communication including an alert that the received expression includes the malware.

16. The system of claim 15, wherein the processor further executes the application to parse the received expression and detect a second character class in the parsed expression.

17. The system of claim 15, wherein the processor further executes the application to create the table and to store the table in the memory.

18. The system of claim 17, wherein the processor further executes instructions to:

detect that the received expression includes a different character class associated with a different pseudo character; and generate a different bit-vector for the different character class detected in the expression.

19. The system of claim 18, wherein the process further executes instructions to update the table regarding the different bit-vector for the different character class detected in the received expression.

20. The system of claim 15, further comprising a user interface that receives the expression from an appliance administrator.

* * * * *